United States Patent
Saito

(10) Patent No.: US 9,357,481 B2
(45) Date of Patent: May 31, 2016

(54) CONTROL METHOD FOR ADAPTIVE MODULATION CIRCUIT AND WIRELESS TRANSMISSION DEVICE PROVIDED WITH ADAPTIVE MODULATION CIRCUIT

(75) Inventor: Kaichiro Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 16 days.

(21) Appl. No.: 14/125,527

(22) PCT Filed: Jun. 7, 2012

(86) PCT No.: PCT/JP2012/064665
§ 371 (c)(1),
(2), (4) Date: Dec. 11, 2013

(87) PCT Pub. No.: WO2012/173036
PCT Pub. Date: Dec. 20, 2012

(65) Prior Publication Data
US 2014/0112181 A1   Apr. 24, 2014

(30) Foreign Application Priority Data

Jun. 13, 2011   (JP) ................................ 2011-131019

(51) Int. Cl.
| | | |
|---|---|---|
| H04W 52/02 | (2009.01) | |
| H04L 1/00 | (2006.01) | |
| H04L 1/20 | (2006.01) | |
| H04W 52/26 | (2009.01) | |
| H04L 1/22 | (2006.01) | |

(52) U.S. Cl.
CPC ......... *H04W 52/0203* (2013.01); *H04L 1/0003* (2013.01); *H04L 1/0019* (2013.01); *H04L 1/203* (2013.01); *H04W 52/262* (2013.01); *H04L 1/22* (2013.01)

(58) Field of Classification Search
None
See application file for complete search history.

(56) References Cited

U.S. PATENT DOCUMENTS

| 2012/0023252 A1* | 1/2012 | Helmke ......................... 709/231 |
|---|---|---|
| 2012/0184227 A1* | 7/2012 | Saito ............................. 455/102 |

FOREIGN PATENT DOCUMENTS

| JP | 2005-260414 A | 9/2005 |
|---|---|---|
| JP | 2006-165939 A | 6/2006 |

(Continued)

OTHER PUBLICATIONS

International Search Report in PCT/JP2012/064665 dated Aug. 21, 2012 (English Translation Thereof).

(Continued)

*Primary Examiner* — Ian N Moore
*Assistant Examiner* — Brian T Le
(74) *Attorney, Agent, or Firm* — McGinn IP Law Group, PLLC

(57) ABSTRACT

In a wireless transmission device provided with an adaptive modulation circuit and a control method for the adaptive modulation circuit, an Ethernet signal received from a wired transmission path is transmitted to an opposite station one-to-one via a wireless transmission path and the Ethernet signal in the opposite station is again output to the wired transmission path. A traffic-statistics circuit which accumulates a traffic volume of a time zone-specific Ethernet signal as statistical data is provided. A wireless transmission capacity can be reduced by decreasing a multi-level number of a modulation scheme in a time zone in which the traffic volume is small based on the accumulated statistical data.

13 Claims, 3 Drawing Sheets

(56) References Cited

FOREIGN PATENT DOCUMENTS

| RU | 2289202 C2 | 12/2006 |
| WO | WO 2007/008981 A1 | 1/2007 |
| WO | WO 2009/054264 A1 | 4/2009 |
| WO | WO 2010/063309 A1 | 6/2010 |
| WO | WO 2011/037218 A1 | 3/2011 |

OTHER PUBLICATIONS

European Search Report dated Oct. 14, 2014.
Russian Office Action dated Mar. 17, 2015 with an English translation thereof.
Russian Office Action dated Sep. 2, 2015 with an English translation.

\* cited by examiner

FIG. 3

| STATISTICAL TRAFFIC VOLUME X | | WIRELESS TRANSMISSION CAPACITY | MODULATION SCHEME | WIRELESS TRANSMISSION POWER |
|---|---|---|---|---|
| CONDITION 1 | X<th1 | c1 | m1 | p1 |
| CONDITION 2 | th1≦x<th2 | c2 | m2 | p2 |
| CONDITION 3 | th2≦X | c3 | m3 | p3 |

US 9,357,481 B2

CONTROL METHOD FOR ADAPTIVE MODULATION CIRCUIT AND WIRELESS TRANSMISSION DEVICE PROVIDED WITH ADAPTIVE MODULATION CIRCUIT

TECHNICAL FIELD

The present invention relates to a wireless transmission device provided with an adaptive modulation circuit, which transmits an Ethernet (registered trademark) signal received from a wired transmission path to an opposite station one-to-one via a wireless transmission path and again outputs the Ethernet signal in the opposite station to the wired transmission path, and a control method for the adaptive modulation circuit.

BACKGROUND ART

As a wireless transmission device of the related art, a wireless transmission device in which a transmission and reception device estimates a transmission path situation based on a received signal, satisfies communication quality of a fixed level in a propagation path situation, and deter nines a modulation scheme representing a highest transmission speed as a first modulation scheme is known (for example, see Patent Document 1).

The wireless transmission device disclosed in Patent Document 1 detects a traffic volume of transmission data and determines a modulation scheme representing a lowest transmission speed at which the traffic volume can be transmitted as a second modulation scheme.

This wireless transmission device selects a modulation scheme of a lower transmission speed within the first modulation scheme and the second modulation scheme as a transmission modulation scheme.

Further, this wireless transmission device reduces power consumption by sequentially selecting modulation schemes so that a wireless transmission capacity according to a traffic volume is provided.

As a wireless transmission device of the related art, a wireless transmission device using a communication traffic volume in information for determining communication capability according to a communication control function is known (for example, see Patent Document 2).

The wireless transmission device disclosed in Patent Document 2 uses a communication time zone in the information for determining the communication capability according to the communication control function.

This wireless transmission device can implement optimum communication capability and optimum power consumption according to the communication traffic condition and implement optimum communication capability and optimum power consumption according to the communication time zone.

In this manner, various proposals for a method of reducing power consumption of a wireless transmission device by controlling an adaptive modulation circuit and wireless transmission power based on a traffic volume of a transmission signal have been made so far.

As general technology, when a multi-level number of the wireless modulation scheme increases, a wireless transmission capacity increases but error tolerance of the wireless transmission path is degraded. When the multi-level number of the wireless modulation scheme decreases, the wireless transmission capacity decreases but high error tolerance is securable.

That is, when a modulation scheme of a small multi-level number is used on the same wireless propagation condition, a good propagation characteristic can be obtained at lower transmission power.

Normally, it is known that, although the traffic volume is varied in real time, there is a correlation between an operation time zone and a traffic volume.

In particular, when a discontinuous signal stream is transmitted using a wireless transmission device which continuously performs wireless transmission and reception, wireless transmission and reception are constantly maintained even in a state in which there is no traffic to be transmitted.

Because fixed power is constantly consumed even in a situation in which the traffic volume has been reduced, power control according to a line state or traffic volume is required.

DOCUMENTS OF THE PRIOR ART

Patent Documents

[Patent Document 1]
Japanese Unexamined Patent Application, First Publication No. 2006-165939
[Patent Document 2]
Japanese Unexamined Patent Application, First Publication No. 2005-260414

DISCLOSURE OF INVENTION

Problems to be Solved by the Invention

The wireless transmission device of Patent Document 1 can reduce power consumption by sequentially selecting modulation schemes so that a wireless transmission capacity according to traffic volume is provided.

However, for an adaptive modulation control scheme in cooperation with a sequentially varying traffic volume in this wireless transmission device, adaptive modulation control follows instantaneous fluctuation in a transmission signal.

Accordingly, a sufficient power consumption suppression effect is not obtained in the technology disclosed in Patent Document 1.

On the other hand, according to the technology disclosed in Patent Document 2, it is possible to implement optimum communication capability and optimum power consumption according to the communication traffic condition and implement optimum communication capability and optimum power consumption according to the communication time zone.

However, in the wireless transmission device of Patent Document 2, a process is performed based on a predetermined information amount.

Accordingly, it is difficult for this device to self-apply with a characteristic of an actual operation line in order to perform an operation for a fixed predetermined time.

The present invention has been made to solve the above-described problem, and an object of the present invention provides a wireless transmission device provided with an adaptive modulation circuit and a control method for the adaptive modulation circuit which enable wireless transmission power of a time zone in which a traffic volume is statistically small to be suppressed according to an installation environment and enable an effect of reducing power consumption to be achieved.

Means for Solving the Problem

A wireless transmission device provided with an adaptive modulation circuit in an aspect of the present invention is a wireless transmission device which transmits an Ethernet signal received from a wired transmission path to an opposite station one-to-one via a wireless transmission path and again outputs the Ethernet signal in the opposite station to the wired transmission path, including: a traffic-statistics circuit which accumulates a traffic volume of a time zone-specific Ethernet signal as statistical data, wherein a wireless transmission capacity is reduced by decreasing a multi-level number of a modulation scheme in a time zone in which the traffic volume is small based on the statistical data accumulated in the traffic-statistics circuit.

A wireless transmission device provided with an adaptive modulation circuit in an aspect of the present invention is a wireless transmission device which transmits an Ethernet signal received from a wired transmission path to an opposite station one-to-one via a wireless transmission path and again outputs the Ethernet signal in the opposite station to the wired transmission path, including: a traffic-statistics circuit which accumulates a traffic volume of a time zone-specific Ethernet signal as statistical data and generates statistical traffic volume information by calculating a mode value of traffic volume information of the same time zone based on the traffic volume information accumulated in a predetermined fixed period, wherein wireless transmission power corresponding to a received electric field margin of the wireless transmission path generated by decreasing a multi-level number of a modulation scheme in a range in which fixed line quality is securable is reduced.

A wireless transmission device provided with an adaptive modulation circuit in an aspect of the present invention is a wireless transmission device which transmits an Ethernet signal received from a wired transmission path to an opposite station one-to-one via a wireless transmission path and again outputs the Ethernet signal in the opposite station to the wired transmission path, including: a traffic-statistics circuit which accumulates a traffic volume of a time zone-specific Ethernet signal as statistical data and generates statistical traffic volume information by calculating a mode value of traffic volume information of the same time zone based on the traffic volume information accumulated in a predetermined fixed period, wherein a wireless transmission capacity is reduced by decreasing a multi-level number of a modulation scheme in a time zone in which the traffic volume is small based on the statistical data accumulated in the traffic-statistics circuit and wireless transmission power corresponding to a received electric field margin of the wireless transmission path generated by decreasing the multi-level number of the modulation scheme in a range in which fixed line quality is securable is reduced.

The wireless transmission device provided with the adaptive modulation circuit in the aspect of the present invention includes the adaptive modulation circuit including a modulation scheme-setting circuit which selects a predetermined modulation scheme and wireless transmission power according to statistical traffic volume information obtained from the traffic-statistics circuit to generate wireless transmission capacity information, modulation scheme information, and wireless transmission power control information.

A control method for an adaptive modulation circuit in an aspect of the present invention is a control method for an adaptive modulation circuit which transmits an Ethernet signal received from a wired transmission path to an opposite station one-to-one via a wireless transmission path and again outputs the Ethernet signal in the opposite station to the wired transmission path, including: accumulating a traffic volume of a time zone-specific Ethernet signal as statistical data; reducing a wireless transmission capacity by decreasing a multi-level number of a modulation scheme in a time zone in which the traffic volume is small based on the statistical data; and reducing wireless transmission power corresponding to a received electric field margin of a wireless transmission path generated by decreasing the multi-level number of the modulation scheme in a range in which fixed line quality is securable.

Effects of the Invention

According to a wireless transmission device provided with an adaptive modulation circuit and a control method for the adaptive modulation circuit according to the present invention, it is possible to reduce wireless transmission power of a time zone in which a traffic volume is statistically small according to an installation environment and to reduce power consumption.

BRIEF DESCRIPTION OF THE DRAWINGS

FIG. 3 is a table determined by a relationship between a value of the statistical traffic volume and a threshold value in the control method for the adaptive modulation circuit according to the embodiment of the present invention.

EMBODIMENTS FOR CARRYING OUT THE INVENTION

Hereinafter, a wireless transmission device having an adaptive modulation circuit and a control method for the adaptive modulation circuit according to an embodiment of the present invention will be described with reference to the drawings.

Figure 1:
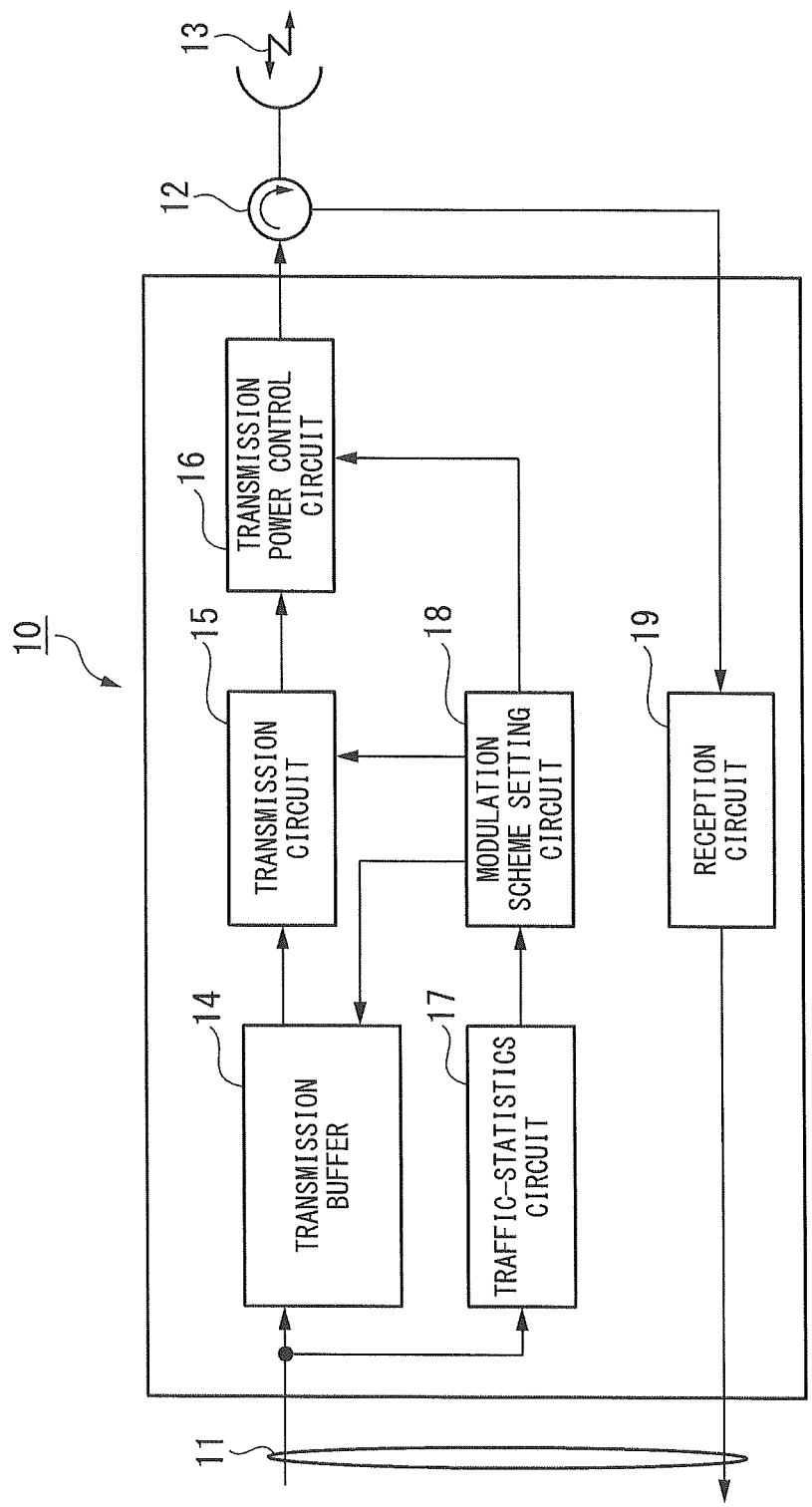
FIG. 1 is a block configuration diagram of a wireless transmission device provided with an adaptive modulation circuit according to an embodiment of the present invention. (a) of FIG. 2 is a time transition diagram of statistical traffic volume information generated by a traffic-statistics circuit in a control method for the adaptive modulation circuit according to the embodiment of the present invention. (b) of FIG. 2 is a time transition diagram of a wireless transition capacity selected based on the statistical traffic volume information received by a modulation scheme-setting circuit from the traffic-statistics circuit in the control method for the adaptive modulation circuit according to the embodiment of the present invention. (c) of FIG. 2 is a time transition diagram of a modulation scheme selected based on the statistical traffic volume information received by the modulation scheme-setting circuit from the traffic-statistics circuit in the control method for the adaptive modulation circuit according to the embodiment of the present invention. (d) of FIG. 2 is a time transition diagram of wireless transmission power selected based on the statistical traffic volume information received by the modulation scheme-setting circuit from the traffic-statistics circuit in the control method for the adaptive modulation circuit according to the embodiment of the present invention.

As illustrated in FIG. 1, a wireless transmission device 10 includes an adaptive modulation function connected to a wired transmission path 11.

The wireless transmission device 10 is connected to a wireless transmission path 13 via a circulator 12 which separates a wireless transmission signal into a transmission signal and a reception signal.

The wireless transmission device 10 includes a transmission buffer 14, a transmission circuit 15, a transmission power control circuit 16, a traffic-statistics circuit 17, a modulation scheme-setting circuit 18, and a reception circuit 19.

The wireless transmission device 10 outputs an Ethernet signal received from the wired transmission path 11 to the wireless transmission path 13 via the transmission buffer 14, the transmission circuit 15, the transmission power control circuit 16, and the circulator 12.

In addition, the wireless transmission device 10 outputs an Ethernet signal received from an opposite station (not illustrated) via the wireless transmission path 13 to the wired transmission path 11 via the circulator 12 and the reception circuit 19.

The traffic-statistics circuit 17 constantly monitors the Ethernet signal received from the wired transmission path 11, and accumulates time zone-specific traffic volume information by detecting a traffic volume in predetermined fixed time units.

In addition, the traffic-statistics circuit 17 generates statistical traffic volume information by calculating a mode value of traffic volume information of the same time zone based on the traffic volume information accumulated in a predetermined fixed period, and notifies the modulation scheme-setting circuit 18 to be described later of the generated statistical traffic volume information.

According to the statistical traffic volume information received from the traffic-statistics circuit 17, the modulation scheme-setting circuit 18 selects a predetermined modulation scheme and wireless transmission power to generate wireless transmission capacity information, modulation scheme information, and wireless transmission power control information.

Then, the modulation scheme-setting circuit 18 outputs the generated wireless transmission capacity information, modulation scheme information, and wireless transmission power control information to each of the transmission buffer 14, the transmission circuit 15, and the transmission power control circuit 16.

Next, a process in which the modulation scheme-setting circuit 18 determines a wireless transmission capacity, a modulation scheme, and wireless transmission power in the control information for the adaptive modulation circuit will be described in detail with reference to (a), (b), (c), and (d) in FIG. 2 and FIG. 3.

Figure 2:
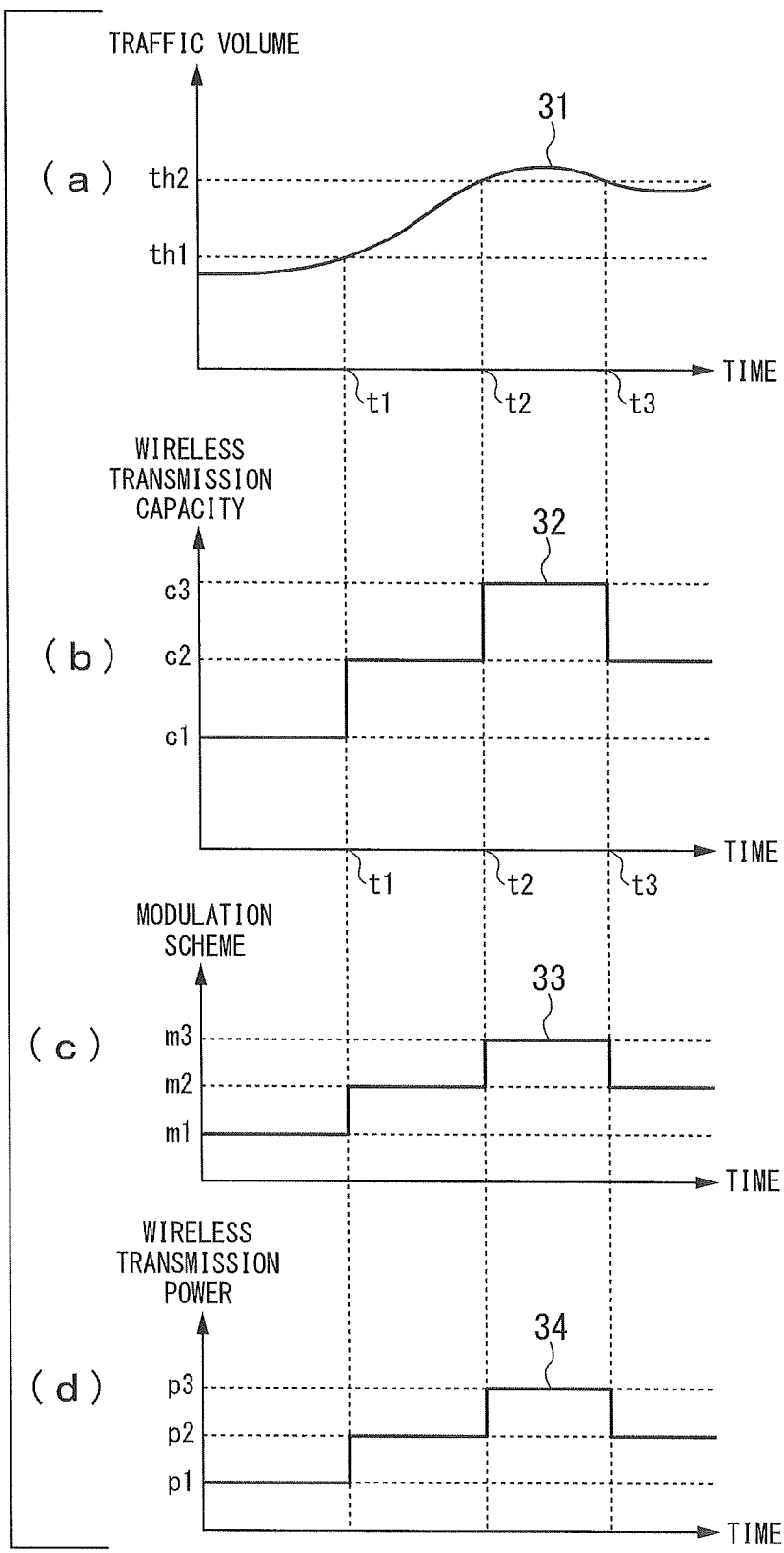

(a) of FIG. 2 illustrates the time transition of the statistical traffic volume information generated by the traffic-statistics circuit 17, and th1 and th2 represent threshold values of a statistical traffic volume 31 serving as a criterion for changing a wireless transmission capacity 32, a modulation scheme 33, and wireless transmission power 34.

In addition, in (a) of FIG. 2, times t1, t2, and t3 represent times at which the statistical traffic volume 31 crosses the threshold values th1 and th2.

(b), (c), and (d) of FIG. 2 illustrate time transitions of the wireless transmission capacity 32, the modulation scheme 33, and the wireless transmission power 34 selected by the modulation scheme-setting circuit 18 based on the statistical traffic volume information received from the traffic-statistics circuit 17, respectively.

Then, by referring to a table of relationships between a value of a statistical traffic volume X and the threshold values th1 and th2 illustrated in FIG. 3, the wireless transmission capacity 32 is determined to be a value of c1 to c3, the modulation scheme 33 is determined to be a value of m1 to m3, and the wireless transmission power 34 is determined to be a value of p1 to p3.

For example, in (a) of FIG. 2, as in a time zone between the time t1 to the time t2, a condition of $th1 \leq X < th2$ illustrated in FIG. 3 is established when the statistical traffic volume 31 is between the threshold value th1 and the threshold value th2.

Thus, each of the value of c2 for the wireless transmission capacity, the value of m2 for the modulation scheme, and the value of p2 for the wireless transmission power is selected.

Returning to FIG. 1, the transmission buffer 14 temporarily accumulates an Ethernet signal when traffic of the Ethernet signal received from the wired transmission path 11 has been congested.

Simultaneously, the transmission buffer 14 outputs the Ethernet signal according to the wireless transmission capacity to the transmission circuit 15 based on the wireless transmission capacity information received from the modulation scheme-setting circuit 18.

The transmission circuit 15 selects the wireless modulation scheme based on the modulation scheme information received from the modulation scheme-setting circuit 18, generates a wireless transmission signal by multiplexing the Ethernet signal received from the transmission buffer 14 into a wireless signal, and outputs the generated wireless transmission signal to the transmission power control circuit 16.

The transmission power control circuit 16 selects the wireless transmission power based on the wireless transmission power information received from the modulation scheme-setting circuit 18 and outputs the wireless transmission signal received from the transmission circuit 15 to the wireless transmission path 13 via the circulator 12.

The reception circuit 19 extracts the Ethernet signal multiplexed by the opposite station (not illustrated) from the wireless reception signal received from the wireless transmission path 13 via the circulator 12 and outputs the extracted Ethernet signal to the wired transmission path 11.

Next, the control method for the adaptive modulation circuit to be executed by the wireless transmission device 10 will be described in detail with reference to FIGS. 1 to 3 in accordance with the time transition diagrams illustrated in (a), (b), (c), and (d) in FIG. 2.

In (a), (b), (c), and (d) of FIG. 2, a time zone up to time t1 represents a time zone in which a traffic volume is statistically small.

Thus, a section in which a control process of decreasing the multi-level number of the modulation scheme and suppressing transmission power for a margin of a received electric field in a range in which line quality is securable is executed is shown.

At this time, the condition corresponds to Condition 1 illustrated in FIG. 3 because the statistical traffic volume 31 is less than the threshold value th1.

Thereby, the modulation scheme-setting circuit 18 notifies the transmission buffer 14 that the wireless transmission capacity 32 is c1, notifies the transmission circuit 15 that the modulation scheme 33 is m1, and notifies the transmission power control circuit 16 that the wireless transmission power 34 is p1.

In (a), (b), (c), and (d) of FIG. 2, the time zone from the time t2 to the time t3 represents a time zone in which the traffic volume is statistically large.

Thus, a section in which a control process of securing the transmission capacity by increasing the multi-level number of the modulation scheme and increasing transmission power in order to secure necessary line quality is executed is shown.

At this time, the condition corresponds to Condition 3 illustrated in FIG. 3 because the statistical traffic volume 31 is greater than the threshold value th2.

Thereby, the modulation scheme-setting circuit 18 notifies the transmission buffer 14 that the wireless transmission capacity 32 is c3, notifies the transmission circuit 15 that the modulation scheme 33 is m3, and notifies the transmission power control circuit 16 that the wireless transmission power 34 is p3.

In (a), (b), (c), and (d) of FIG. 2, the time zone from the time t1 to the time t2 and a time zone after the time t3 also correspond to Condition 2 illustrated in FIG. 3.

Thus, the modulation scheme-setting circuit 18 notifies the transmission buffer 14 that the wireless transmission capacity 32 is c2, notifies the transmission circuit 15 that the modulation scheme 33 is m2, and notifies the transmission power control circuit 16 that the wireless transmission power 34 is p2.

In this manner, the wireless transmission device 10 can absorb an increase in an instantaneous traffic volume in the transmission buffer 14, and suppress transmission power in a time zone in which a traffic volume is small based on statistical data.

In the embodiment of the present invention, statistical traffic volume information is generated by calculating a mode value of traffic volume information of the same time zone based on the traffic volume information accumulated in the traffic-statistics circuit 17.

As another embodiment different from the above embodiment, a method of calculating the statistical traffic volume is not limited to the mode value, and can also be executed in a method of obtaining a peak value or an average value.

In addition, as a further different embodiment, it is not necessary for all traffic to serve as a statistical target and only traffic coincident with a specific condition such as a data size or a traffic type may serve as the statistical target.

According to the wireless transmission device 10 provided with the adaptive modulation circuit of the embodiment as described above, an instantaneous increase in traffic is absorbed by the transmission buffer 14.

Then, according to the wireless transmission device 10 provided with the adaptive modulation circuit, the traffic-statistics circuit 17 counts a traffic volume of the Ethernet signal according to each time zone and accumulates the counted traffic volume as a statistical traffic volume.

Further, according to the wireless transmission device 10 provided with the adaptive modulation circuit, the wireless transmission capacity is suppressed by decreasing the multi-level number of the wireless modulation scheme in a time zone in which the traffic volume is small based on the statistical traffic volume accumulated in the traffic-statistics circuit 17.

Accordingly, in the wireless transmission device 10 provided with the adaptive modulation circuit, power consumption can be reduced by suppressing the wireless transmission capacity.

In addition, according to the wireless transmission device 10 provided with the adaptive modulation circuit of the embodiment, an instantaneous increase in traffic is absorbed by the transmission buffer 14.

Then, according to the wireless transmission device 10 provided with the adaptive modulation circuit, the traffic-statistics circuit 17 counts a traffic volume of the Ethernet signal according to each time zone and accumulates the counted traffic volume as a statistical traffic volume.

Further, according to the wireless transmission device 10 provided with the adaptive modulation circuit, the wireless transmission power is suppressed in a range in which line quality is securable in a time zone in which the traffic volume is small based on the statistical traffic volume accumulated in the traffic-statistics circuit 17.

Accordingly, in the wireless transmission device 10 provided with the adaptive modulation circuit, power consumption can be reduced by suppressing the wireless transmission capacity.

Then, according to the wireless transmission device 10 provided with the adaptive modulation circuit of the embodiment, an instantaneous increase in traffic is absorbed by the transmission buffer 14.

Then, according to the wireless transmission device 10 provided with the adaptive modulation circuit, the traffic-statistics circuit 17 counts a traffic volume of the Ethernet signal according to each time zone and accumulates the counted traffic volume as a statistical traffic volume.

Further, according to the wireless transmission device 10 provided with the adaptive modulation circuit, the multi-level number of the wireless modulation scheme is decreased in a time zone in which the traffic volume is small based on the statistical traffic volume accumulated in the traffic-statistics circuit 17.

In addition, according to the wireless transmission device 10 provided with the adaptive modulation circuit, the wireless transmission power is suppressed in a range in which line quality is securable in a time zone in which the traffic volume is small based on the statistical traffic volume accumulated in the traffic-statistics circuit 17.

Accordingly, in the wireless transmission device 10 provided with the adaptive modulation circuit, power consumption can be reduced by suppressing the wireless transmission capacity.

In addition, the wireless transmission device 10 provided with the adaptive modulation circuit according to the embodiment of the present invention includes the modulation scheme-setting circuit 18 which selects a predetermined modulation scheme and wireless transmission power according to statistical traffic volume information obtained from the traffic-statistics circuit 17 to generate wireless transmission capacity information, modulation scheme information, and wireless transmission power control information.

Accordingly, in the wireless transmission device 10 provided with the adaptive modulation circuit, it is possible to intensively control a wireless transmission capacity and wireless transmission power in a time zone in which the traffic volume is small according to the modulation scheme-setting circuit 18.

Further, according to the control method for the adaptive modulation circuit of the embodiment, an instantaneous increase in traffic is absorbed, a traffic volume of the Ethernet signal is counted according to each time zone, and the counted traffic volume is accumulated as a statistical traffic volume.

Then, according to the control method for the adaptive modulation circuit according to the embodiment of the present invention, the multi-level number of the wireless modulation scheme is decreased in a time zone in which the traffic volume is small based on the accumulated statistical traffic volume.

Further according to the control method for the adaptive modulation circuit according to the embodiment of the present invention, the wireless transmission power is suppressed in a range in which line quality is securable in a time zone in which the traffic volume is small based on the accumulated statistical traffic volume.

Accordingly, in the control method for the adaptive modulation circuit according to the embodiment of the present invention, power consumption can be reduced by suppressing the wireless transmission capacity.

The wireless transmission device provided with the adaptive modulation circuit and the control method for the adaptive modulation circuit according to the embodiment of the present invention are not limited to the above-described embodiment, and appropriate modifications and improvements, are possible.

INDUSTRIAL APPLICABILITY

As described above, according to a wireless transmission device provided with an adaptive modulation circuit and a control method for the adaptive modulation circuit, it is possible to suppress wireless transmission power of a time zone in which a traffic volume is statistically small according to an installation environment and to reduce power consumption.

As a result of the above, it is possible to apply the present invention to a communication device for an infrastructure used by a communication provider or the like, particularly, a fixed wireless transmission device using microwaves and millimeter waves, and improve the industrial applicability of the present invention.

It is possible to provide a wireless transmission device provided with an adaptive modulation circuit and a control method for the adaptive modulation circuit which enable wireless transmission power of a time zone in which a traffic volume is statistically small to be suppressed according to an installation environment and to reduce power consumption.

Priority is claimed on Japanese Patent Application No. 2011-131019, filed Jun. 13, 2011, the content of which is incorporated herein by reference.

DESCRIPTION OF REFERENCE SYMBOLS

10 Wireless transmission device
11 Wired transmission path
13 Wireless transmission path
17 Traffic-statistics circuit
18 Modulation scheme setting circuit

The invention claimed is:

1. A wireless transmission device which transmits an Ethernet signal received from a wired transmission path to an opposite station one-to-one via a wireless transmission path and again outputs the Ethernet signal in the opposite station to the wired transmission path, comprising:
   a traffic-statistics circuit which accumulates traffic volumes of time zone-specific Ethernet signals and operation time zones corresponding to the traffic volumes as statistical data of traffic volume information indicating a correlation between the traffic volumes and the operation time zones, and generates statistical traffic volume information by calculating a most frequent traffic value of a predetermined number of identical time zones for each of the operation time zones based on the accumulated statistical data of the traffic volume information, the traffic volumes being varied for the operation time zones; and
   an adaptive modulation circuit which suppresses a wireless transmission capacity by decreasing a multi-level number of a modulation scheme in a predetermined operation time zone in which the traffic volume of the operation time zone corresponding to the predetermined operation time zone is smaller than a predetermined traffic value calculated based on the statistical data accumulated in the traffic-statistics circuit.

2. The wireless transmission device provided with the adaptive modulation circuit according to claim 1, wherein the adaptive modulation circuit includes a modulation scheme-setting circuit configured to generate wireless transmission capacity information, modulation scheme information, and wireless transmission power control information by selecting a predetermined modulation scheme and wireless transmission power according to the statistical traffic volume information obtained from the traffic-statistics circuit.

3. The wireless transmission device of claim 1, wherein the traffic-statistics circuit:
   continuously monitors the Ethernet signal received from the wired transmission path; and
   generates the statistical data by calculating a mode value, peak value or average value of traffic volume information of the same operation time zone based on the traffic volume accumulated in a predetermined fixed period.

4. The wireless transmission device of claim 1, wherein the adaptive modulation circuit comprises a modulation scheme-setting circuit, and
   wherein based on the traffic volume information received from the traffic-statistics circuit, the modulation scheme-setting circuit selects a predetermined modulation scheme and wireless transmission power to generate wireless transmission capacity information, modulation scheme information, and wireless transmission power control information.

5. The wireless transmission device of claim 4, wherein the modulation scheme-setting circuit determines a wireless transmission capacity, a modulation scheme, and wireless transmission power control information by referring to a table of relationships between a value of the statistical data and a threshold value.

6. The wireless transmission device of claim 4, further comprising:
   a transmission buffer which:
      temporarily accumulates the Ethernet signal when traffic of the Ethernet signal received from the wired transmission path has been congested; and
      outputs the Ethernet signal based on the wireless transmission capacity information received from the modulation scheme-setting circuit.

7. The wireless transmission device of claim 6, further comprising:
   a transmission circuit which:
      selects the wireless modulation scheme based on the modulation scheme information received from the modulation scheme-setting circuit; and
      generates a wireless transmission signal by multiplexing the Ethernet signal received from the transmission buffer into a wireless signal.

8. The wireless transmission device of claim 7, further comprising:
   a transmission power control circuit which:
      selects the wireless transmission power based on the wireless transmission power information received from the modulation scheme-setting circuit; and
      outputs the wireless transmission signal received from the transmission circuit to the wireless transmission path via a circulator.

9. The wireless transmission device of claim 8, further comprising:
   a reception circuit which:
      extracts an Ethernet signal multiplexed by an opposite station from a wireless reception signal received from the wireless transmission path via the circulator; and
      outputs the extracted Ethernet signal to the wired transmission path.

10. The wireless transmission device of claim 8, wherein the modulation scheme-setting circuit outputs the generated wireless transmission capacity information, modulation scheme information, and wireless transmission power control information to each of the transmission buffer, the transmission circuit, and the transmission power control circuit.

11. A wireless transmission device which transmits an Ethernet signal received from a wired transmission path to an opposite station one-to-one via a wireless transmission path and again outputs the Ethernet signal in the opposite station to the wired transmission path, comprising:

a traffic-statistics circuit which accumulates traffic volumes of time zone-specific Ethernet signals and operation time zones corresponding to the traffic volumes as statistical data of traffic volume information indicating a correlation between the operation time zones and the traffic volumes, and generates statistical traffic volume information by calculating a most frequent traffic value of a predetermined number of identical time zones for each of the operation time zones based on the accumulated statistical data of the traffic volume information, the traffic volumes being varied for the operation time zones; and an adaptive modulation circuit which suppresses wireless transmission power corresponding to a received electric field margin of the wireless transmission path generated by decreasing a multi-level number of a modulation scheme in a range in which fixed line quality is guaranteed, wherein the received electric field margin being generated is determined based on a difference between a reducible wireless transmission power obtained by decreasing the multi-level number of the modulation scheme and a present wireless transmission power.

12. A wireless transmission device which transmits an Ethernet signal received from a wired transmission path to an opposite station one-to-one via a wireless transmission path and again outputs the Ethernet signal in the opposite station to the wired transmission path, comprising:

a traffic-statistics circuit which accumulates traffic volumes of time zone-specific Ethernet signals and operation time zones corresponding to the traffic volumes as statistical data indicating a correlation between the traffic volumes and the operation time zones, the traffic volumes being varied for the operation time zones, and generates statistical traffic volume information by calculating a most frequent value of the traffic volumes for each of corresponding operation time zones accumulated in a predetermined fixed period; and an adaptive modulation circuit which reduces a wireless transmission capacity by decreasing a multi-level number of a modulation scheme in a time interval in which the traffic volume of the operation time zone corresponding to the predetermined fixed period is smaller than a predetermined traffic volume calculated based on the statistical data accumulated in the traffic-statistics circuit and suppresses wireless transmission power corresponding to a received electric field margin of the wireless transmission path generated by decreasing the multi-level number of the modulation scheme in a range in which fixed line quality is guaranteed, wherein the received electric field margin being generated is determined based on a difference between a reducible wireless transmission power obtained by decreasing the multi-level number of the modulation scheme and a present transmission power.

13. A control method for an adaptive modulation circuit which transmits an Ethernet signal received from a wired transmission path to an opposite station one-to-one via a wireless transmission path and again outputs the Ethernet signal in the opposite station to the wired transmission path, comprising:

accumulating traffic volumes of time zone-specific Ethernet signals and operation time zones corresponding to the traffic volumes as statistical data indicating a correlation between the traffic volumes and the operation time zones, the traffic volumes being varied for the operation time zones;

reducing a wireless transmission capacity by decreasing a multi-level number of a modulation scheme in a predetermined operation time zone in which the traffic volume of the operation time zone corresponding to the predetermined operation time zone is smaller than a predetermined traffic volume calculated based on the statistical data; and suppressing wireless transmission power corresponding to a received electric field margin of a wireless transmission path generated by decreasing the multi-level number of the modulation scheme in a range in which fixed line quality is guaranteed, wherein the received electric field margin being generated is determined based on a difference between a reducible wireless transmission power obtained by decreasing the multi-level number of the modulation scheme and a present wireless transmission power.

* * * * *